(12) United States Patent
Stockhammer

(10) Patent No.: US 10,397,295 B2
(45) Date of Patent: Aug. 27, 2019

(54) PROCESSING CONTINUOUS MULTI-PERIOD CONTENT

(71) Applicant: QUALCOMM Incorporated, San Diego, CA (US)

(72) Inventor: Thomas Stockhammer, Bergen (DE)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/823,403

(22) Filed: Nov. 27, 2017

(65) Prior Publication Data

US 2018/0084026 A1    Mar. 22, 2018

Related U.S. Application Data

(62) Division of application No. 14/665,252, filed on Mar. 23, 2015.
(Continued)

(51) Int. Cl.
*G06F 15/16* (2006.01)
*H04L 29/06* (2006.01)
(Continued)

(52) U.S. Cl.
CPC ........ *H04L 65/602* (2013.01); *H04L 65/4069* (2013.01); *H04N 21/234* (2013.01);
(Continued)

(58) Field of Classification Search
USPC .................. 709/219, 202, 201, 203, 231
See application file for complete search history.

(56) References Cited

U.S. PATENT DOCUMENTS 5,870,151 A     2/1999  Korber
2005/0196147 A1*  9/2005  Seo ............... G11B 27/105
                                                386/243
(Continued)

FOREIGN PATENT DOCUMENTS

CN        1130004 A    8/1996
CN      101039404 A    9/2007
(Continued)

OTHER PUBLICATIONS

DVB Organization: "TM-3039-Advert Insertion using MPEG DASH final.pdf", DVB, Digital Video Broadcasting, C/0 EBU—17A Ancienne Route—CH-1218 Grand Saconnex, Geneva—Switzerland, May 28, 2013 (May 28, 2013), XP017841134, chapters 4, 7.
(Continued)

*Primary Examiner* — Lan Dai T Truong
(74) *Attorney, Agent, or Firm* — Shumaker & Sieffert, P.A.

(57) ABSTRACT

In one example, a device includes one or more processors configured to determine that a manifest file for media content indicates that the media content includes a first period and a second period, that the manifest file indicates that the first and second periods are continuous, and that advertisement media data is available for insertion between the first and second periods, select a first adaptation set in the first period based at least in part on characteristics signaled for the first adaptation set, retrieve media data of the first adaptation set based on the selection of the first adaptation set, retrieve the advertisement media data, and retrieve media data of a second adaptation set in the second period that the manifest file indicates is associated with the first adaptation set based on the selection of the first adaptation set and store the retrieved media data to a memory.

14 Claims, 8 Drawing Sheets

Related U.S. Application Data

(60) Provisional application No. 61/969,777, filed on Mar. 24, 2014.

(51) Int. Cl.

| | | |
|---|---|---|
| *H04N 21/234* | (2011.01) | |
| *H04N 21/2343* | (2011.01) | |
| *H04N 21/262* | (2011.01) | |
| *H04N 21/442* | (2011.01) | |
| *H04N 21/81* | (2011.01) | |
| *H04N 21/845* | (2011.01) | |
| *H04N 21/854* | (2011.01) | |
| *H04N 21/235* | (2011.01) | |
| *H04N 21/437* | (2011.01) | |

(52) U.S. Cl.
   CPC ..... *H04N 21/235* (2013.01); *H04N 21/23439* (2013.01); *H04N 21/26258* (2013.01); *H04N 21/437* (2013.01); *H04N 21/44209* (2013.01); *H04N 21/812* (2013.01); *H04N 21/8456* (2013.01); *H04N 21/85406* (2013.01)

(56) References Cited

U.S. PATENT DOCUMENTS

| | | | |
|---|---|---|---|
| 2006/0092117 A1* | 5/2006 | Kubota | G09G 3/3648 345/94 |
| 2008/0071881 A1 | 3/2008 | Kronlund et al. | |
| 2009/0240644 A1* | 9/2009 | Boettcher | H04L 41/142 706/47 |
| 2010/0107191 A1 | 4/2010 | Feng et al. | |
| 2010/0228626 A1 | 9/2010 | Im | |
| 2010/0278156 A1 | 11/2010 | Shin et al. | |
| 2011/0148846 A1* | 6/2011 | Arasawa | G09G 3/3614 345/212 |
| 2011/0238507 A1 | 9/2011 | Ben-Rubi | |
| 2013/0111509 A1 | 5/2013 | Guo et al. | |
| 2013/0159421 A1 | 6/2013 | Yue et al. | |
| 2013/0185398 A1 | 7/2013 | Thang et al. | |
| 2013/0276005 A1 | 10/2013 | Kim et al. | |
| 2013/0279879 A1 | 10/2013 | Watanabe et al. | |
| 2014/0025839 A1* | 1/2014 | Marko | H04H 20/42 709/231 |
| 2015/0019629 A1 | 1/2015 | Giladi et al. | |
| 2015/0100702 A1* | 4/2015 | Krishna | H04N 21/23439 709/231 |
| 2015/0271237 A1 | 9/2015 | Stockhammer | |
| 2015/0365458 A1* | 12/2015 | Yamagishi | H04N 21/26616 709/219 |

FOREIGN PATENT DOCUMENTS

| | | |
|---|---|---|
| CN | 101110935 A | 1/2008 |
| CN | 101765856 A | 6/2010 |
| WO | 2012096353 A1 | 7/2012 |
| WO | 2013152326 A1 | 10/2013 |

OTHER PUBLICATIONS

Fielding R., et al., "Hypertext Transfer Protocol—HTTP/1.1", Network Working Group, RFC 2616, Jun. 1999, pp. 1-176.

International Preliminary Report on Patentability of International Application No. PCT/US2015/022264, dated Jun. 17, 2016, 8 pp.

International Search Report and Written Opinion—PCT/US2015/022264—ISA/EPO—dated Jun. 30, 2015.

ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 1, 2012 (Apr. 1, 2012), pp. I-VI, 1-126, XP002712145, paragraph A.7-A.9 paragraph [OA.4].

Overview of 3GPP Release 12 V0.1.1, Dec. 2013, 289 pp.

Response to Second Written Opinion dated Feb. 9, 2016, from International Application No. PCT/US2015/022264, dated Mar. 23, 2016, 20 pp.

Response to Written Opinion dated Jun. 30, 2015, from International Application No. PCT/US2015/022264, dated Nov. 3, 2015, 17 pp.

Second Written Opinion of International Application No. PCT/US2015/022264, dated Feb. 9, 2016, 7 pp.

"Study of ISO/IEC PDTR 23009-3 DASH Implementation Guidelines", 104. MPEG Meeting;Apr. 22, 2013-Apr. 26, 2013; Incheon; (Motion Picture Expert Group or ISO/IEC JTC1/SC29/WG11),, No. N13514, Jun. 12, 2013 (Jun. 12, 2013), XP030020264, chapters 5.3.2, 5.4.

Godart-Brown, "Advert Insertion using MPEG DASH," DVB, Digitial Video Broadcasting, Version 1.0, XP017841134, May 15, 2013, 42 pp.

"Information technology—Dynamic adaptive streaming over HTTP (DASH)—Part 3: Implementation guidelines," ISO/IEC 23009-3, International Standard, Jan. 25, 2013, 51 pp.

"Information technology—Dynamic adaptive streaming over HTTP (DASH)—Part 1: Media presentation description and segment formats," International STANDARD_ISO/IEC FDIS 23009-1_ISO/IEC JTC 1_Secretariat: ANSI, Swiss, ISO, Jan. 27, 2014 (year/month/day), 28 pp.

* cited by examiner

PROCESSING CONTINUOUS MULTI-PERIOD CONTENT

This application is a divisional of U.S. application Ser. No. 14/665,252, filed Mar. 23, 2015, which claims the benefit of U.S. Provisional Application Ser. No. 61/969,777, filed Mar. 24, 2014, the entire contents of each of which are hereby incorporated by reference.

TECHNICAL FIELD

This disclosure relates to transport of media data, e.g., streaming of media data over a network.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265/MPEG-H Part 2, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data (and/or other media data, such as audio and/or timed text data) has been encoded, the media data may be packetized for transmission or storage. The packetized media data may be sent using a unicast protocol, such as hypertext transfer protocol (HTTP), or a broadcast or multicast protocol, such as Enhanced Multimedia Broadcast Multicast Service (eMBMS).

SUMMARY

In general, this disclosure describes techniques for preparing media content that is used for adaptive streaming such that in the playout and streaming case, additional media data (e.g., advertisement media data) into an existing set of media data may be spliced and added by signaling a period boundary, for example by a decision at the sender that uses the content or by the receiver that receives the content, but at the same time when no additional media content is added, the receiver has sufficient information that the decoding and playout of the content at the receiver is continuous across the period boundary, i.e. maintaining period continuity. Media content may be separated into distinct periods, where each period includes one or more adaptation sets, each containing one or more representations. In general, representations within the same adaptation set may be considered alternatives to each other, such that a client device may switch between representations, e.g., to adapt to changing network bandwidth. Adaptation sets within a period may include such switchable representations, that is, representations that share common coding and rendering characteristics but differ in bitrates.

This disclosure describes techniques for splitting a content offered in one period into two continuous periods, such that additional media data can be inserted between the continuous periods. In this manner, characteristics for representations of the continuous periods need not be re-signaled following the added media data. Instead, the same signaled characteristics for the data of the representations in one period may be used for the data of the representations in the next, continuous period (where additional media data may be inserted between the continuous periods). In this manner, the media data of the media content and the added media data may be presented in a continuous fashion. For example, a client device may use an adaptation set of the second period that corresponds to an adaptation set of the first period, based on the selection of the adaptation set of the first period (e.g., without re-analyzing characteristics of the adaptation set of the second period and without re-initializing the media parsing and decoding entity in the client).

In one example, a method of retrieving media data includes determining that a manifest file for media content indicates that the media content includes a first period and a second period, that the manifest file indicates that the first and second periods are continuous, and that advertisement media data is available for insertion between the first and second periods, selecting a first adaptation set in the first period based at least in part on characteristics signaled for the first adaptation set, retrieving media data of the first adaptation set based on the selection of the first adaptation set, retrieving the advertisement media data; and retrieving media data of a second adaptation set in the second period that is associated with the first adaptation set based on the selection of the first adaptation set.

In another example, a device for retrieving media data includes a memory configured to store media data, and one or more hardware-based processors configured to determine that a manifest file for media content indicates that the media content includes a first period and a second period, that the manifest file indicates that the first and second periods are continuous, and that advertisement media data is available for insertion between the first and second periods, select a first adaptation set in the first period based at least in part on characteristics signaled for the first adaptation set, retrieve media data of the first adaptation set based on the selection of the first adaptation set, retrieve the advertisement media data, and retrieve media data of a second adaptation set in the second period that the manifest file indicates is associated with the first adaptation set based on the selection of the first adaptation set and store the retrieved media data to the memory.

In another example, a method of sending media data includes splitting, by a media server, main content of media data into a plurality of periods including a first period and a second period, wherein the first period and the second period are temporally sequential, inserting, by the media server, secondary media content between the first period and the second period, signaling, by the media server, a time indicator for each of the plurality of periods, wherein the time indicator defines one or more time characteristics for each of the plurality of periods, and receiving, by the media server, a request from a dynamic adaptive streaming over HTTP (DASH) client to retrieve a media stream comprising the plurality of periods, the secondary media content, and the time indicators.

In another example, a device for sending media data includes a memory configured to store media data, and one or more hardware-based processors configured to split main content of the media data into a plurality of periods including a first period and a second period that are temporally sequential, insert secondary media content between the first period and the second period, signal a time indicator for each of the plurality of periods, wherein the time indicator defines one or more time characteristics for each of the plurality of periods, and receive a request from a dynamic adaptive streaming over HTTP (DASH) client to retrieve a media stream comprising the plurality of periods, the secondary media content, and the time indicators.

The details of one or more examples are set forth in the accompanying drawings and the description below. Other features, objects, and advantages will be apparent from the description and drawings, and from the claims.

DETAILED DESCRIPTION

Figure 1:
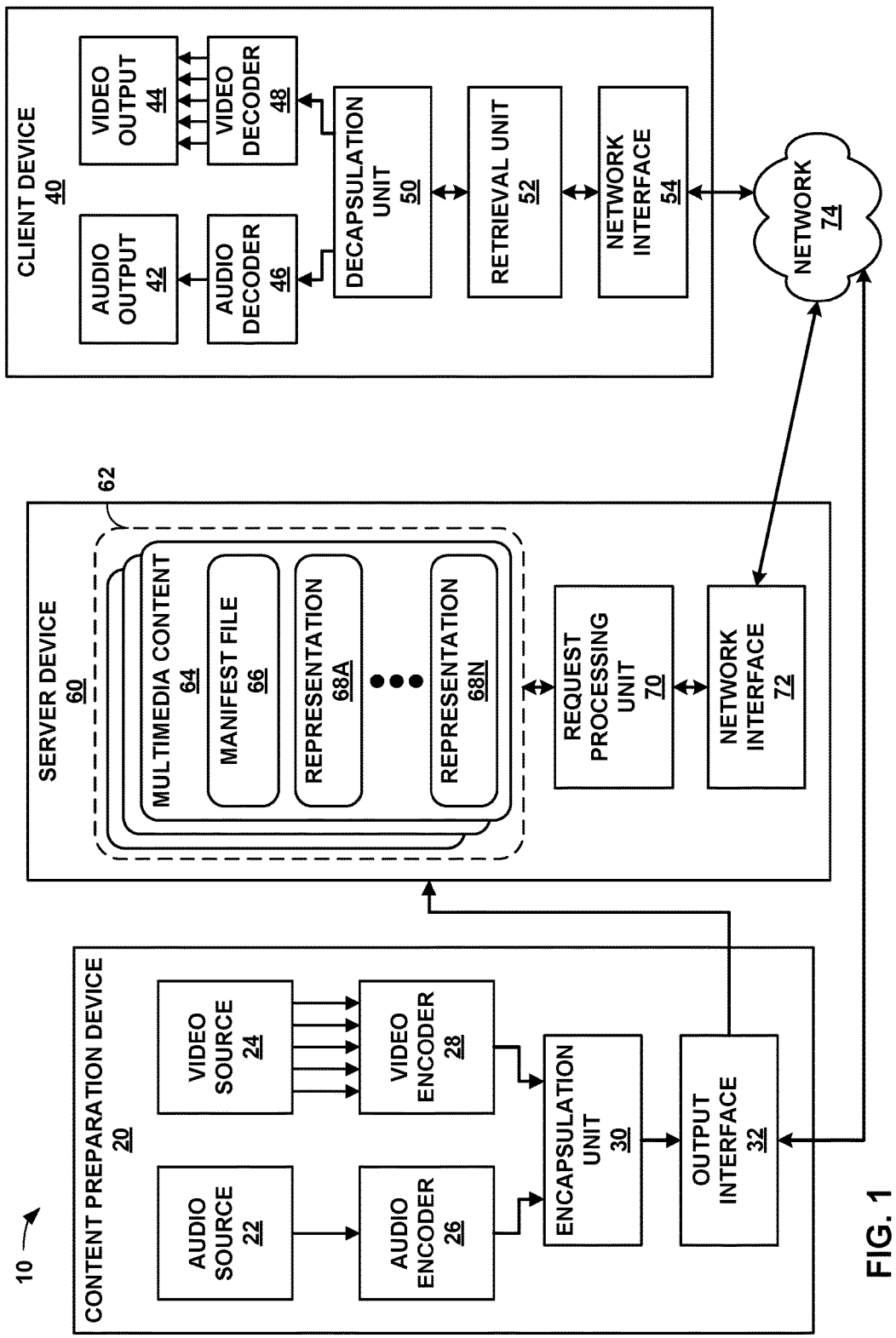
FIG. 1 is a block diagram illustrating an example system that implements techniques for streaming media data over a network.

In general, this disclosure describes techniques for advertisement (ad) insertion in a continuous, multi-period stream. These techniques may be used when streaming media data, e.g., according to a unicast service (such as HTTP), broadcast, or multicast service, such as Enhanced Multimedia Broadcast Multicast Service (eMBMS). For example, the techniques of this disclosure may be used in conjunction with, or to augment the techniques of, MBMS Improvements-Enhanced MBMS Operation (MI-EMO). MI-EMO is described in, e.g., Overview of 3GPP Release 12 V0.1.1, December 2013, available at http://www.3gpp.org/ftp/Information/WORK_PLAN/Description_Releases/Rel-12_description_20131224.zip.

It should be understood that the advertisement data is media data, i.e., data presented to a user during one or more brief intermissions of the presentation of the primary media data. The additional media data (e.g., advertisement media data) is generally presented in substantially the same manner as the primary media data. For example, if the primary media data includes both audio and video data, the advertisement media data likely also includes audio and video data. Thus, the advertisement data should not be confused with a server advertisement to a client device that is generally not presented to a user.

The techniques of this disclosure may be applied in the context of a streaming network protocol, such as Dynamic Adaptive Streaming over HTTP (DASH). In DASH, media content is divided into a set of representations, where each representation corresponds to a particular combination of characteristics, e.g., coding characteristics (such as CODEC, profile, level, and the like), rendering characteristics (e.g., view angle, picture dimensions, frame rate, and the like), and bit rate. The media content may further include adaptation sets, where each adaptation set includes a plurality of representations that act as switchable alternatives to each other, such that the representations share the same rendering characteristics but differ by bitrate, e.g., for the purpose of bandwidth adaptation. These characteristics of the representations, as well as indications of adaptation sets, are typically signaled in a manifest file. Furthermore, each adaptation set may correspond to a particular period of the media content, where each period may include one or more adaptation sets. One period generally corresponds to a section of the media content defined by a starting playback time for the period until the starting playback time for a subsequent period. Media content may include one or more periods.

This disclosure relates to the conversion of a manifest file, such as a Media Presentation Description (MPD), and content generated as On-Demand or live content to an MPD (or other manifest file) with multiple periods providing period continuity. Content with multiple periods may be created for different reasons. For example, multiple periods may be created to enable splicing of content, for example for ad insertion. In another example, multiple periods may be created to provide a synchronization point to avoid drift in segment numbering. In another example, multiple periods may be created to remove or add certain representations in an adaptation set. In another example, multiple periods may be created to remove or add certain adaptation sets. In another example, multiple periods may be created to add or remove content offered on certain content distribution networks (CDNs). In another example, multiple periods may be created to enable signaling of shorter segments, if produced by the encoder. These example techniques may be used alone or in any combination.

Periods provide opportunities for advertisement insertion, also known as cues. But ads may or may not be added, based on decisions taken the sender or the client. Therefore content for which no ad is inserted, is typically continuous in terms of media parsing and rendering. If the periods are continuous, continuous playout for the client is signaled, such that the client does not have to reinitialize and to avoid any possibly result of a glitch at the period boundary. To address continuous playout, this disclosure describes various techniques. In one example, a content provider splits regular On-Demand Content into multiple periods and provides period continuity signaling. In another example, a content provider splits regular Live Content into multiple periods and provides period continuity signaling. In another example, a content provider signals content to enable period continuity. In another example, a content provider signals multiple periods based on MPD information only without modifying the media content, i.e. the representations.

In some examples, when receiving media content using broadcast or multicast, an MBMS client or eMBMS client may receive the media content, then make the media content available to a streaming client, such as a DASH client. The DASH client may retrieve the media content from the MBMS client using, e.g., HTTP retrieval operations. In HTTP streaming, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that may be accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that may be accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a period element in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding period relative to the start time of the first period. Each period may extend until the start of the next period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Typically, no continuity is necessary at a period boundary in terms of content offering. The content may be offered with different codecs, language attributes, content protection and so on. It is expected that the client plays the content continuously across periods, but there may be implications in terms of implementation to make the playout fully continuous and seamless.

Generally, audio/video switching across period boundaries may not be seamless. According to ISO/IEC 23009-1, section 7.2.1, at the start of a new period, the playout procedure of the media content components may need to be adjusted at the end of the preceding period to match the periodStart time of the new period as there may be small overlaps or gaps with the representation at the end of the preceding period. Overlaps (respectively gaps) may result from Media Segments with actual presentation duration of the media stream longer (respectively shorter) than indicated by the period duration. Also in the beginning of a period, if the earliest presentation time of any access unit of a representation may not be equal to the presentation time offset signaled in the @presentationTimeOffset, then the playout procedures need to be adjusted accordingly.

However, under certain conditions, seamless continuation of the presentation across periods may be achieved, especially if the content is properly conditioned. This section provides an overview on content offering requirements and recommendations across periods and the client behavior when downloading and presenting content across periods.

Note that the discussion below applies to both static and dynamic Media Presentations, and the techniques described below may be independent of the use of xlink. The rules described below may apply for the case after remote elements are dereferenced.

The presentation duration of a representation may be the difference between the end presentation time of the representation and the earliest presentation time of the representation. The presentation time duration may have, for example, the same unit as presentation time offset, i.e., @timescale, and expresses the exact presentation duration of the representation.

The presentation duration may be signaled by one of the two following example techniques, or similar techniques. One example technique involves a new optional attribute @presentationTimeDuration specifying the presentation duration of the included representation in the time scale of the @timescale attribute. A second example technique involves a supplemental descriptor with @scheme_id_URI set to "urn:mpeg:dash:period_continuity:2014," which may be provided for an adaptation set with the @value of the descriptor, PID, matching the value of an @id of a period that may be contained in the MPD, the value of the AdaptationSet@id being AID, and the value of the @presentationTimeOffset for this adaptation sets may be provided and may be PTO.

If this signal is present, then for the period with the value of the period@id being PID and for the adaptation set with AdaptationSet@id being AID, the presentation duration of each representation in this adaptation set may be obtained as the difference of PTO minus the value of the @presentationTimeOffset.

If content may be offered with multiple periods, then the content provider could offer the content such that actual media presentation time may be as close as possible to the actual period duration. It may be recommended that the period duration may be the maximum of the presentation duration of all representations contained in the period.

In certain circumstances the content provider offers content in the next period that may be a continuation of the content in the previous period, possibly in the immediately following period or in a later period. The latter case applies for example after an advertisement period had been inserted. The content provider may express that the media components contained in two adaptation sets in two different periods are associated by assigning equivalent Asset Identifiers to both periods and by identifying both adaptation sets with identical value for the attribute @id.

If adaptation sets in two different periods are associated, then any or all of the following parameters may be identical for the two adaptation sets: the language as described by the @lang attribute, the media component type described by the @contentType attribute, the picture aspect ratio as described by the @par attribute, any role property as described by the Role elements, any accessibility property as described by the Accessibility elements, and any viewpoint property as described by the Viewpoint elements. In one example, the DASH standard may be modified according to the techniques of this disclosure to require that, where adaptation sets in two different periods are associated, each of the parameters above is identical for the two adaptation sets.

Furthermore, two adaptation sets in one MPD may be said to be period-continuous if each of the following conditions is true for the two adaptation sets:
 the adaptation sets are indicated as being, and/or determined to be, associated,
 the @presentationTimeOffset may be present or can be inferred as 0 for all representations in both adaptation sets,
 within one adaptation set, the value of @presentationTimeOffset may be identical for all representations,
 the sum of the value of the @presentationTimeOffset and the presentation duration of all representations in one adaptation stare identical to the value of the @presentationTimeOffset of the other adaptation set, and
 if representations in both adaptation sets have the same value for @id, then they have functionally equivalent Initialization Segments, i.e., the Initialization Segment of one representation may be used to continue the play-out of the other representation.

Content authors could signal period-continuous adaptation sets by signaling the presentation duration using one of the two example techniques introduced above (e.g., using presentation duration signaling, such as the @presentationTimeDuration attribute and/or the supplemental descriptor with @scheme_id_URI set to "urn:mpeg:dash:period_continuity:2014"). Content authors could offer an MPD with period-continuous adaptation sets if the MPD contains periods with identical Asset Identifiers. Furthermore, if two adaptation sets in one MPD are period-continuous and the second adaptation set has associated a Supplementary Descriptor with @schemeIDURI="urn:mpeg:dash:period-switchable," then the concatenation of any representation of the first Adaptation with any representation from the second adaptation set without the Initialization Segment results in a bitstream format that conforms to the media formats in use as signaled in the first adaptation set. This property may be referred to as period-concatenable adaptation sets. For simplified processing at clients, content authors may offer an MPD with period-concatenable adaptation sets if the MPD contains periods with identical Asset Identifiers.

Typically, no continuity is ensured at a period boundary, in terms of content offering. The content may be offered with different codecs, language attributes, and different protection, among other things. The client could play the content continuously across periods, but there may be implications in terms of implementation to provide fully continuous and seamless playout. It may be the case that at period boundaries (e.g., where there is no continuity), the presentation engine may be reinitialized, for example due to changes in formats, codecs or other properties. This may result in a re-initialization delay. Such a re-initialization delay could be reduced or minimized.

If the MPD is of type static, then the actual media presentation could be extended by the initialization delays. However, in case of dynamic services, the addition of the re-initialization delay to the playout may result in drift between the encoder and the presentation engine. Therefore, the playout could be adjusted at the end of each period to provide a continuous presentation without adding drift between the time documented in the MPD and the actual playout, i.e., the difference between the actual playout time and the period start time could remain constant.

If the client presents media components of a certain adaptation set in one period, and if the following period has assigned an identical Asset Identifier, then the client could identify an associated period and, in the absence of other information, continue playing the content in the associated adaptation set.

If furthermore the adaptation sets are period-continuous, i.e., the presentation times are continuous and this may be signaled in the MPD, then the client may seamlessly play the content across the period boundary. Most suitably, the client may continue playing the representation in the adaptation set with the same @id, but there may be no guarantee that this representation may be available. In this case, the client shall seamlessly switch to any other representation in the adaptation set.

The input format may be an MPD that conforms to the On-Demand profile. The relevant elements and attributes of the MPD are provided in the table below. In the below example, the MPD contains two adaptation sets.

TABLE 1

Relevant Information for On-Demand Profile

| MPD Information | Status | Comment |
| --- | --- | --- |
| MPD@type | mandatory, set to "static" | the type of the Media Presentation may be static, i.e., Segments get available at availability start time. |
| MPD@profiles | mandatory, set to "urn:mpeg:dash:profile:is off-on-demand:2011" | the MPD profile may be set to On-Demand |
| AdaptationSet@subsegmentAlignment | mandatory to be set to true | |
| AdaptationSet@subsegmentStartsWithSAP | mandatory to be set to 1 or 2 | |
| representation@bandwidth | | |
| representation.BaseURL | | |
| SegmentBase@timescale | optional default | presentation time offset of media presentation. |
| SegmentBase@presentationTimeOffset | optional default | presentation time offset of media presentation. |
| SegmentBase@presentationDuration | optional | to be added in an update to DASH spec |
| SegmentBase@indexRange | mandatory to be present in DASH-IF/264 | |

For each representation, the Segment Index may be downloaded with the URL of the representation provided in BaseURL denoted as baseURL and the value of SegmentBase@indexRange denoted as init as follows:
  GET baseURL HTTP/1.1
  Range: bytes=0-(init-1)

Then the received byte range may be parsed for the Segment Index. From the first Segment Index box, information may be extracted. The timescale of the track may be extracted from the Segment Index timescale and may be denoted as timescale. The total number of subsegments Nsub may be extracted from the Segment Index as the reference_count. The earliest presentation time ept may be extracted from the Segment Index as the earliest_presentation_time. The first offset fo may be extracted from the Segment Index as the first_offset. For each leaf subsegment i, the subsegment duration in the Segment Index of each leaf subsegment denoted as sdur[i], the size of the subsegment size[i], and other subsegment related information ssi[i].

In one example of an on-demand stream, the presentation may be split in two periods earliest at media presentation time tsplit expressed relative to the period Start time. There may be two adaptation sets and each adaptation set may have one representation. In some examples, an alignment of a subsegment boundary of the adaptation sets may be applied.

The following information may be assumed to be available for single period content.
  period@start ps
  MPD@mediaPresentationDuration mpDUR
  BaseURL bu1, bu2
  SegmentBase@indexRange ir1, ir2
  SegmentBase@timescale ts1, ts2
  SegmentBase@presentationDuration pd1, pd2
  The Segment Index of the representation
    Nsub1, Nsub2
    ept1, ept2
    fo1, fo2
    sdur1[i], sdur2[i]
    fo1[i], fo2[i]
    ssi1[i], ssi2[i]

In order to generate a new media presentation, the following information may be generated:
  Update of attributes and elements in the first period for each representation of each adaptation set:
    a. period@start ps1
    b. add period@duration pdur1=tsplit
    c. BaseURL bu11, bu12
    d. SegmentBase@indexRange ir11, ir12
    e. SegmentBase@presentationTimeOffset pto11, pto12
    f. SegmentBase@presentationDuration pd11, pd12
    g. The Segment Index of the representation
      i. Nsub11, Nsub12
      ii. ept11, ept12
      iii. fo11, fo12
      iv. sdur11[i], sdur12[i]
      v. ssi11[i], ssi12[i]
    h. The representation itself may be shortened
  Update and addition of elements and attributes in the new second period for each representation:
    a. add period@duration pdur2
    b. BaseURL bu21, bu22
    c. SegmentBase@indexRange ir21, ir22
    d. SegmentBase@presentationTimeOffset pto21, pto22
    e. SegmentBase@presentationDuration pd21, pd22
    f. The Segment Index of the representation
      i. Nsub21, Nsub22
      ii. ept21, ept22
      iii. fo21, fo22
      iv. sdur21[i], sdur22[i]
      v. ssi21[i], ssi22[i]
  The representation itself may be generated.

The new information may be generated as follows for the first representation that aligns with the segment boundary. First the Nsub11 may be found that corresponds to tsplit, e.g., according to the following algorithm:
  time=ept1−pto1
  Nsub11=0

```
while (time<tsplit*ts1 && Nsub11<Nsub1))
do
    time+=sdur[Nsub11]
    Nsub11++
done
```

By this algorithm, Nsub11 may be determined. Nsub11 may be smaller than Nsub1. If Nsub11 is not smaller than Nsub1, no period split is necessarily done.

The splitting time for representation 1 may be tsplit1=time/ts1>=tsplit as a split at an exact segment boundary may be desired. Note that the announced split may be tsplit, but on a representation level, only segment boundaries are split. The new segment index size may be smaller than the previous one, i.e., the new segment index size may be (Nsub1−Nsub11)*12 byte smaller. This may be deducted from the first offset.

Time may be the presentation duration pd11. The period@start of the period 1 may be maintained. The period@duration may be set to tsplit. The following algorithm is one example of how the new information may be generated for representation 1 in period 1.

```
bu11=bu1_period1
ir11=ir1−(Nsub1−Nsub11)*12
pto11=pto1
pd11=time
ept11=ept1
fo11=fo1−(Nsub1−Nsub11)*12
i=0
while (while (i<Nsub11))
do
    ssi11[i]=ssi1[i]
    i++
done
```

Then Nsub12 may be found that corresponds to tsplit, e.g., according to the following algorithm:

```
time=ept2−pto2
Nsub12=0
while (time<tsplit*ts2 && Nsub12<Nsub2))
do
    time+=sdur[Nsub12]
    Nsub12++
done
```

The real splitting time for representation 2 may be tsplit2=time/ts2>=tsplit, a split at an exact subsegment boundary may be desired. The new segment index size may be smaller than the previous one, e.g., it may be (Nsub2−Nsub12)*12 bytes smaller. This may be deducted from the first offset.

Time may be the presentation duration pd21. The algorithm below is one example of how the new information may be generated for representation 2 in period 1.

```
bu12=bu2_period1
ir12=ir2−(Nsub2−Nsub12)*12
pto12=pto2
pd12=time
ept12=ept2
fo12=fo2−(Nsub2−Nsub12)*12
i=0
while (while (i<Nsub12))
do
    ssi12[i]=ssi2[i]
    i++
done
```

A new period 2 may be generated. In particular, in one example, a server device may generate the new period2. First of all, server device 60 may copy the information from period 1 (also the asset identifier, and adaptation sets with ids, and so on). The period@start of the new period need not be provided. The period@duration pdur2 of the new period may be mpDUR−tsplit. The following algorithm is an example of how the new information may be generated for representation 1 in period 2.

```
Nsub12=Nsub1−Nsub11
bu21=bu1_period2
ir21=ir1−(Nsub1−Nsub12)*12
pto21=(tsplit1−tsplit)*ts1
pd21=pd1−pd11
ept21=pd11
fo21=fo1−(Nsub1−Nsub12)*12
i=0
while (while (i<Nsub12))
do
    ssi21[i]=ssi1[i+Nsub11]
    i++
done
```

The following algorithm is one example of how the new information may be generated for representation 2 in period 2.

```
Nsub22=Nsub2−Nsub12
bu22=bu2_period2
ir22=ir2−(Nsub2−Nsub22)*12
pto22=(tsplit2−tsplit)*ts2
pd22=pd2−pd12
ept22=pd12
fo22=fo2−(Nsub2−Nsub22)*12
i=0
while (while (i<Nsub22))
do
    ssi22[i]=ssi2[i+Nsub12]
    i++
done
```

In other examples, tsplit1 may be used as a split time in order to have pto21 being 0. This may be the case, as splitting may be done at IDR frame.

The above information can be mapped back into a complete MPD with the same information, but by the algorithm discussed above, a splice point at time tsplit may be generated. Any period can be inserted at the splice point. The above effort may remove MPD@mediaPresentationDuration and add and replace as documented above.

In another example technique of this disclosure, a live stream may be used. For a live profile information, the information may be available from the MPD and the Segments. The timescale of the track may be extracted from the Segment Index timescale and may be denoted as timescale. The total number of segments Nseg may be extracted from the Segment Information. The earliest presentation time ept may be extracted from the Segment Index as the earliest_presentation_time. The first offset @startNumber may be extracted from the MPD. For each segment I, the segment duration in the Segment Index of each leaf subsegment denoted as sdur[i] and other segment related information si[i].

In one example presentation, the presentation may be split in two periods earliest at media presentation time tsplit expressed relative to the period Start time. This splitting may not align with the segment boundary of the second adaptation set. There may be two adaptation sets and each adaptation set may have one representation.

The following information may be assumed to be available for the single period content.

period@start ps
MPD@mediaPresentationDuration mpDUR

SegmentTemplate@media mt1, mt2
SegmentTemplate@timecale ts1, ts2
SegmentTemplate@presentationDuration pd1, pd2
The Segment Information
   Nseg1, Nseg2
   ept1, ept2
   sn1, sn2
   sdur1[i], sdur2[i]
   si1[i], si2[i]

In order to generate a new media presentation, the following information may be generated:

A server device may update attributes and elements in the first period for each representation of each adaptation set, as follows:
  period@start ps1
  add period@duration pdur1=tsplit
  SegmentTemplate@media mt11, mt12
  SegmentTemplate@presentationTimeOffset pto11, pto12
  SegmentTemplate@presentationDuration pd11, pd12
  The Segment Information of the representation
    Nseg11, Nseg12
    ept11, ept12
    sn11, sn12
    sdur11[i], sdur12[i]
    si11[i], si12[i]
  The representation itself may be shortened A server device may update and add elements and attributes in the new second period for each representation, as follows:
  add period@duration pdur2
  SegmentTemplate@media mt21, mt22
  SegmentTemplate@presentationTimeOffset pto21, pto22
  SegmentTemplate@presentationDuration pd21, pd22
  The Segment Information of the representation
    Nseg21, Nseg22
    ept21, ept22
    sn21, sn22
    sdur21[i], sdur22[i]
    si21[i], si22[i]
  The representation itself may be generated A server device may generate new information as follows for the first representation that aligns with the segment boundary. First the Nseg11 may be found that corresponds to tsplit, according to the following algorithm:
  time=ept1−pto1
  Nseg11=0
  while (time<tsplit*ts1 && Nseg11<Nseg1))
  do
    time+=sdur[Nseg11]
    Nseg11++
  done By this algorithm, a server device may determine Nseg11. Nseg11 may be smaller than Nseg1. If Nseg11 is not smaller than Nseg1, no period split may be done. Time may be the presentation duration pd11. The splitting time for representation 1 may be tsplit1=time/ts1>=tsplit as a split at an exact segment boundary may be desired. Note that the announced split may be tsplit, but on a representation level only segment boundaries may be split. The period@start of the period 1 may be maintained. The period@duration may be set to tsplit. The following algorithm is an example of how the new information may be generated for representation 1 in period 1.
  mt11=mt1
  pto11=pto1
  pd11=time
  ept11=ept1
  sn11=sn1
  i=0
  while (while (i<Nseg11))
  do
    si11[i]=si1[i]
    i++
  done Then Nseg12 may be found that corresponds to tsplit, e.g., according to the following example algorithm:
  time=ept2−pto2
  Nseg12=0
  while (time<tsplit*ts2 && Nseg12<Nseg2))
  do
    time+=sdur[Nseg12]
    Nseg12++
  done The real splitting time for representation 2 may be tsplit2=time/ts2>=tsplit as a split at an exact subsegment boundary may be desired. Time may be the presentation duration pd12. The following algorithm is an example of how the new information may be generated for representation 2 in period 1.
  mt12=mt2
  pto12=pto2
  pd12=time
  ept12=ept2
  sn12=sn2
  i=0
  while (while (i<Nseg12))
  do
    si12[i]=si2[i]
    i++
  done A new period 2 may be generated. First of all, the information from period 1 may be copied (also the asset identifier, and adaptation sets with ids and so on). The period@start of the new period may not be provided. The period@duration pdur2 of the new period may be mpDUR−tsplit. The following algorithm is an example of how the new information may be generated for representation 1 in period 2.
  Nseg12=Nseg1−Nseg11
  mt21=mt1
  pto21=(tsplit1−tsplit)*ts1
  pd21=pd1−pd11
  ept21=pd11
  sn21=sn1+Nseg11
  i=0
  while (while (i<Nseg12))
  do
    si21[i]=si1[i+Nseg11]
    i++
  done The following algorithm is an example of how the new information may be generated for representation 2 in period 2.
  Nseg22=Nseg2−Nseg12
  mt22=mt2
  pto22=(tsplit1−tsplit)*ts2
  pd22=pd2−pd12
  ept22=pd12
  sn22=sn2+Nseg12
  i=0
  while (while (i<Nseg22))
  do si22[i]=si2[i+Nseg12]
    i++
    done In some examples, tsplit1 may be used as split time in order to have pto21 being 0. This may be the case, as splitting may be done at IDR frame.

The above information can be mapped back into a complete MPD with the same information, but by this a splice point at time tsplit may be generated. Any period can be inserted here. The above effort may remove MPD@mediaPresentationDuration and add and replace the information documented above.

Using techniques of the current disclosure, On-Demand profile may be optimized. The issue with the On-Demand profile offering may be that in order to do a period construction for ad insertion, one has to physically modify the file. This has two consequences. First, the modifications require file level modifications and are relatively complex. This means that for ad insertion, the content may be changed. Second, if different ad splicing points are considered, different content and different URLs may be used. This means that for the same content, storage and especially caching efficiency may be reduced. Therefore, it may be proposed in the following to enable period and ad insertion based on MPD-level information only. This requires a few modifications in the MPD and these tools shall be added to the newly developed ad insertion profile that includes xlink.

In one example of an on-demand stream, the presentation may be split in two periods earliest at media presentation time tsplit expressed relative to the period Start time. There may be two adaptation sets and each adaptation set may have one representation. In some examples, an alignment of a subsegment boundary of the adaptation sets may be applied. The following information may be assumed to be available for the single period content.
    period@start ps
    MPD@mediaPresentationDuration mpDUR
    BaseURL bu1, bu2
    SegmentBase@indexRange ir1, ir2
    SegmentBase@timecale ts1, ts2
    SegmentBase@presentationDuration pd1, pd2
    The Segment Index of the representation
        Nsub1, Nsub2
        ept1, ept2
        fo1, fo2
        sdur1[i], sdur2[i]
        fo1[i], fo2[i]
        ssi1[i], ssi2[i]

In order to generate a new media presentation, the following information may be generated:
    Update of attributes and elements in the first period for each representation of each adaptation set:
        period@start ps1
        add period@duration pdur1=tsplit
        SegmentBase@indexRange
        SegmentBase@presentationTimeOffset pto11, pto12
        SegmentBase@presentationDuration pd11, pd12
    Update and addition of elements and attributes in the new second period for each representation:
        add period@duration pdur2
        SegmentBase@indexRange
        SegmentBase@presentationTimeOffset pto21, pto22
        SegmentBase@presentationDuration pd21, pd22

The above information for pto and pd may be generated in the same way as for the On-Demand Profile. The only difference may be that it may be explicitly said in the representation, that only the time between pto and pd may be played for this representation, using the information in the Segment Index.

Figure 3:
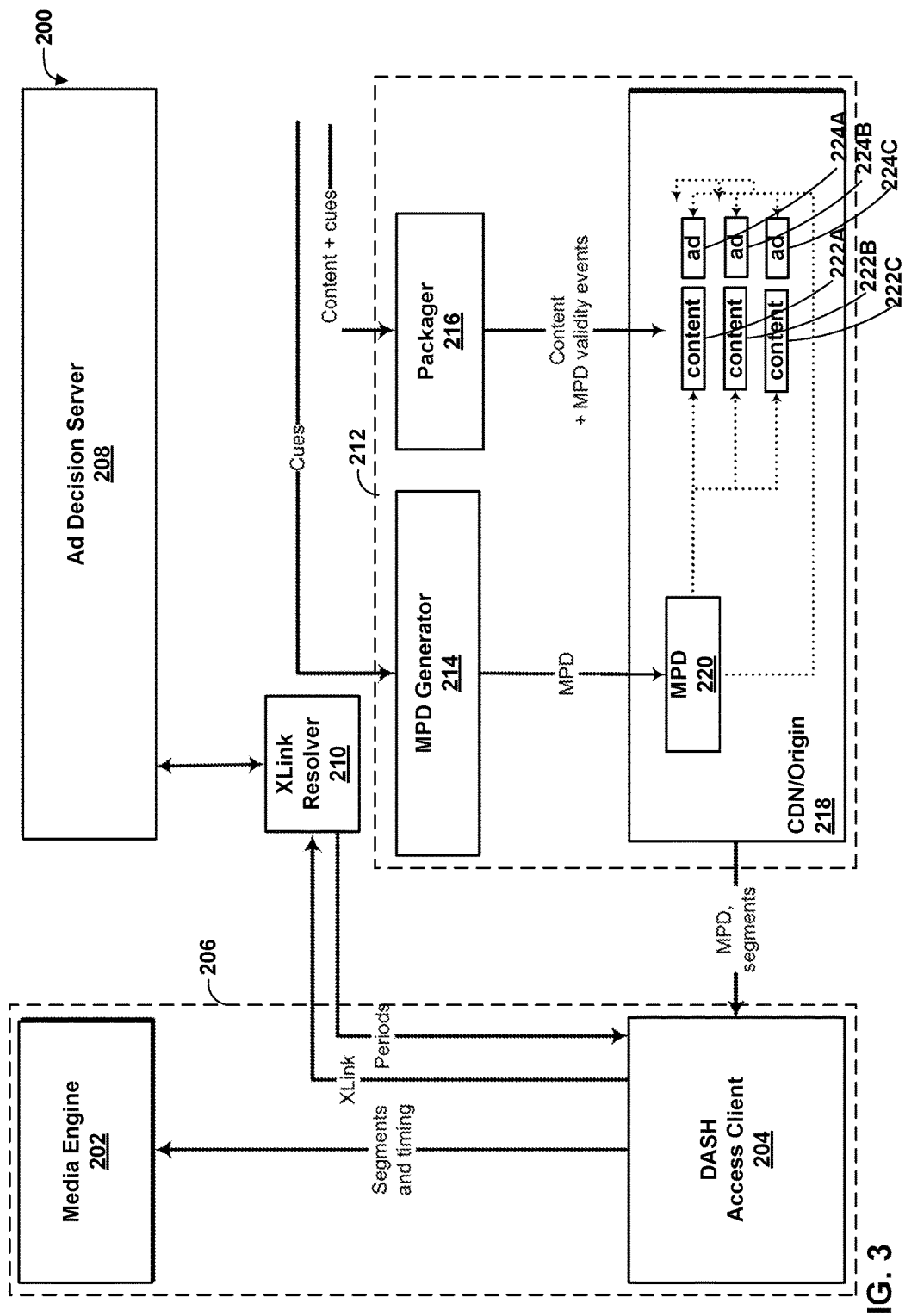
FIG. 3 is a block diagram illustrating another example system that may implement the techniques of this disclosure.

The following example is in reference to FIG. 3. An MPD may be available that points to On-Demand content on the CDN containing a single period presentation. The MPD, based on cues (ad insertion opportunities), may be modified to ad multiple periods without changing the content on the server. For each opportunity, an xlink to the Ad Decision server may be provided. The MPD may be provided to the DASH client. For each xlink in the MPD, it may be checked if ads are added, possibly targeted to the user. If not, the period may be resolved to 0. If so, other content may be added. The DASH client plays the content continuously, and if resolved to zero, the media engine may not be newly initialized.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level could be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66. In accordance with the techniques of this disclosure, server device 60 may modify manifest file 66 to indicate that multimedia content 64 includes two or more continuous periods, between which advertisement content may be inserted.

In particular, server device 60 may construct manifest file 66 using any of the various techniques described above, or similar techniques, to indicate that there are continuous periods in multimedia content 64, such that additional content (such as advertisement content) can be inserted between the continuous periods. For example, server device 60 may add a Period@duration attribute to manifest file 66 for each period that is split into two continuous periods. Likewise, server device 60 may add data indicative of the new, continuous period to manifest file 66, such as a Period@duration element, baseURL elements, SegmentBase@indexRange elements, SegmentBase@presentationTimeOffset elements, and SegmentBase@presentationDuration elements. Furthermore, server device 60 may signal the various segment index elements discussed above, and generate new representations for the new period from the existing representations.

Accordingly, in some examples, server device 60 may split main content of media data into a plurality of periods including a first period and a second period, where the first period and the second period are temporally sequential. That is, the first and second periods include data for main content that is intended to be played out continuously. Server device 60 may insert secondary media content (e.g., advertisement media content) between the first and second periods. Furthermore, server device 60 may signal a time indicator for each of the plurality of periods that defines one or more time characteristics for each of the plurality of periods. The time indicator may comprise, for example, Period@duration attributes in manifest file 66 for the periods. Server device 60 may then receive a request from, e.g., client device 40 to retrieve a media stream comprising the periods, the secondary media content, and the time indicators. The request may be one of a plurality of requests to retrieve data of the media stream from client device 40. For example, the plurality of requests may be HTTP GET or partial GET requests.

Although the techniques above are described with respect to server device 60, it should be understood that content preparation device 20 may also (i.e., in addition or in the alternative) be configured to split a period into two continuous periods and to insert advertisement media data between the continuous periods.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 (which may implement the techniques of this disclosure) may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Furthermore, in accordance with the techniques of this disclosure, retrieval unit 52 may be configured to determine whether manifest file 66 indicates that two or more periods of multimedia content 64 are continuous. For example, retrieval unit 52 may determine that two adaptation sets of two periods are period-continuous when the adaptation sets are associated, manifest file 66 includes an @presentationTimeOffset element, or can be inferred as 0, for all representations in the adaptation sets, within one adaptation set the value of @presentationTimeOffset is identical for all representations, the sum of the value of the @presentationTimeOffset, and the presentation duration of all representations in one adaptation set are identical to the value of the @presentationTimeOffset of the other adaptation set.

Moreover, retrieval unit 52 may use the initialization segment of one representation in one adaptation set of one period as an initialization segment for a representation of another adaptation set of another period, where the adaptation sets are period-continuous, if the representations have the same value for @id. Likewise, where two adaptation sets are period-continuous and the later adaptation set has an associated supplementary descriptor with @schemeIDURI="urn:mpeg:dash:period-switchable," retrieval unit 52 may determine that representations in one of the adaptation sets can be concatenated with any representation from the other adaptation set without the initialization segment of the other adaptation set. In this manner, retrieval unit 52 may select an adaptation set of the second period based on a selection of an adaptation set of the first period (e.g., without additionally analyzing characteristics of the adaptation set of the second period), assuming the first and second periods are continuous.

In this manner, retrieval unit 52 may be configured to determine that a manifest file for media content indicates that the media content includes a first period and a second period, that the manifest file indicates that the first and second periods are continuous, and that advertisement media data is available for insertion between the first and second periods. Retrieval unit 52 may also be configured to select a first adaptation set in the first period based at least in part on characteristics signaled for the first adaptation set. Such characteristics may include, for example, coding and rendering characteristics, such as codec, profile, level, picture dimensions, frame rate, or the like. To select the adaptation set, retrieval unit 52 may compare coding and rendering capabilities of client device 40 to the characteristics of the various available adaptation sets, and select an adaptation set that can be coded and rendered by client device 40.

Retrieval unit 52 may then retrieve media data of the first adaptation set based on the selection of the first adaptation set. More particularly, retrieval unit 52 may select a representation of the adaptation set (if more than one representation is available), e.g., based on available network bandwidth and bitrates for the representations of the adaptation set, such that the bitrate for the representation does not exceed the available network bandwidth. Retrieval unit 52 may also retrieve the advertisement media data. Furthermore, retrieval unit 52 may retrieve media data of a second adaptation set in the second period that is associated with the first adaptation set based on the selection of the first adaptation set. Thus, retrieval unit 52 may simply determine that the second adaptation set is period-continuous with the first adaptation set, and simply select the second adaptation set because it is period-continuous with the first adaptation set which was already selected, rather than analyzing characteristics of adaptation sets of the second period as was done for the first adaptation set.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it could be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In one example, a method of retrieving media data is described, the method comprising splitting, by a media server, main content of media data into a plurality of periods, inserting, by the media server, secondary media content between a first period and a second period, wherein the first period and the second period are temporally sequential, signaling, by the media server, a time indicator for each of the plurality of periods, wherein the time indicator defines one or more time characteristics for each of the plurality of periods, and receiving, by the media server, a request to retrieve, from a dynamic adaptive streaming over HTTP (DASH) client, a media stream comprising the plurality of periods, the secondary media content, and the time indicators.

In another example, a method of retrieving media data is described, the method comprising determining that a manifest file for media content indicates that the media content includes a first period and a second period, that the manifest file indicates that the first and second periods are continuous, and that advertisement media data is available for insertion between the first and second periods, selecting a first adaptation set in the first period based at least in part on characteristics signaled for the first adaptation set, retrieving media data of the first adaptation set based on the selection of the first adaptation set, retrieving the advertisement media data, and retrieving media data of a second adaptation set in the second period that the manifest file indicates is associated with the first adaptation set based on the selection of the first adaptation set.

In another example, a method of retrieving media data is described, the method comprising determining whether media content includes a first period and a second period, determining whether the first period and the second period are continuous, determining whether advertisement media data is available for insertion between the first and second periods, and forming a manifest file, wherein the manifest file includes indications of whether the media content includes the first period and the second period, whether the first period and the second period are continuous, and whether the advertisement media data is available for insertion between the first and second periods.

Figure 2:
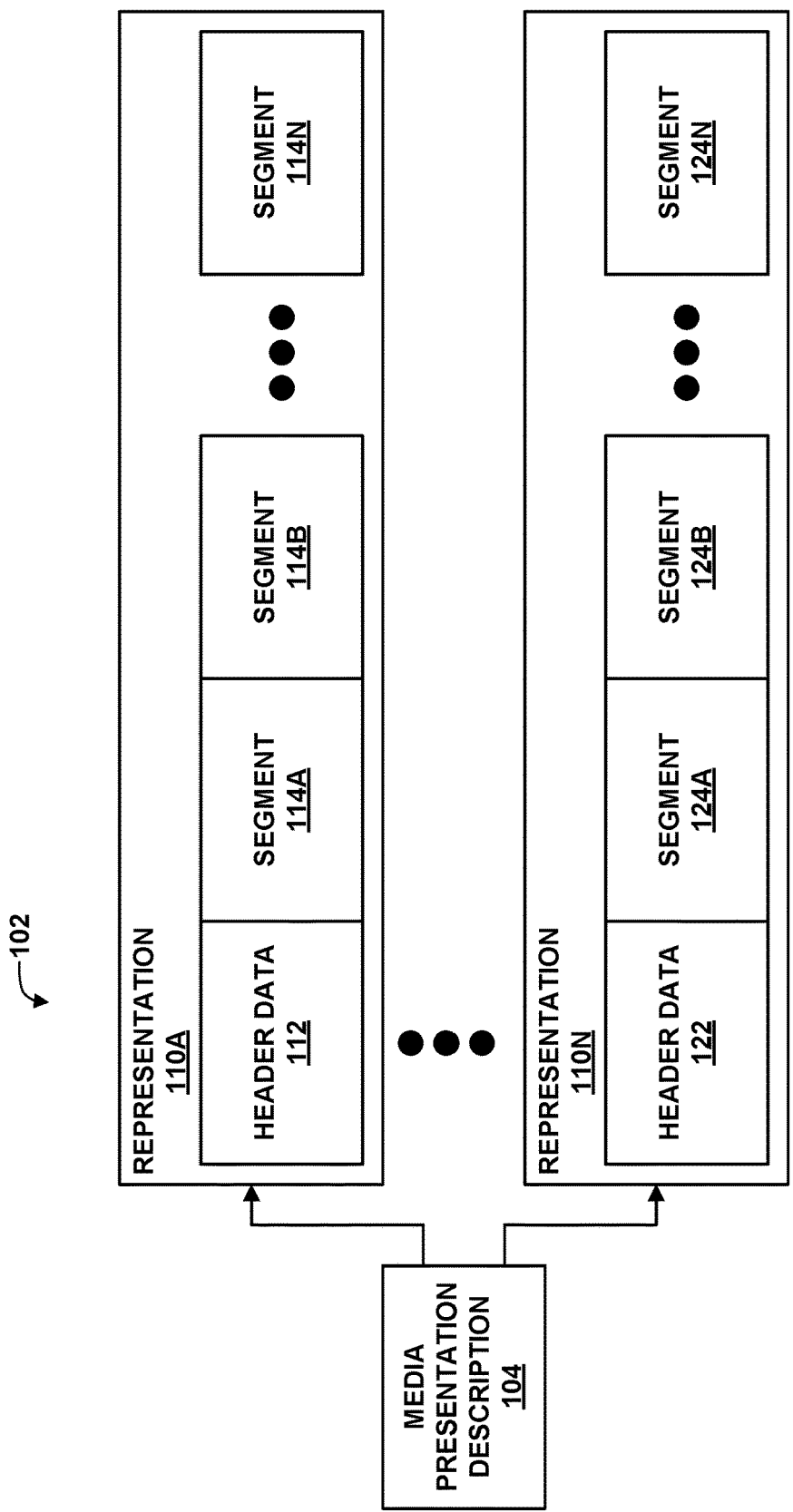
FIG. 2 is a conceptual diagram illustrating elements of example multimedia content.

FIG. 2 is a conceptual diagram illustrating elements of example multimedia content 102. Multimedia content 102 may correspond to multimedia content 64 (FIG. 1), or another multimedia content stored in memory 62. In the example of FIG. 2, multimedia content 102 includes media presentation description (MPD) 104 and a plurality of representations 110A-110N. Representation 110A includes optional header data 112 and segments 114A-114N (segments 114), while representation 110N includes optional header data 122 and segments 124A-124N (segments 124). The letter N is used to designate the last movie fragment in each of representations 110A, 110N as a matter of convenience. In some examples, there may be different numbers of movie fragments between representations 110A, 110N.

MPD 104 may comprise a data structure separate from representations 110A-110N. MPD 104 may correspond to manifest file 66 of FIG. 1. Likewise, representations 110A-110N may correspond to representations 68 of FIG. 1. In general, MPD 104 may include data that generally describes characteristics of representations 110A-110N, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points (RAPs, also referred to as stream access points (SAPs)), which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114, 124 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 2. MPD 104 may include characteristics as described by the 3GPP Specification, with the addition of any or all of the signaled information described in this disclosure.

Each of segments 114, 124 may be associated with a unique uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124.

Media presentation description 104 may, in accordance with the techniques of this disclosure, indicate that a period to which representations 110A-110N correspond is continuous with another period, two which subsequent representations (not shown) may correspond. Accordingly, an adaptation set including representations 110A-110N may be associated with an adaptation set of the other period. Thus, one or more characteristics of the adaptation set including representations 110A-110N may be the same as the other adaptation set, where such characteristics may include any or all of language as described by a @lang attribute of media presentation description 104, media component type described by a @contentType attribute of media presentation description 104, picture aspect ratio as described by a @par attribute of media presentation description 104, any role property as described by Role elements of media presentation description 104, any accessibility property as described by Accessibility elements of media presentation description 104, and/or any viewpoint property as described by Viewpoint elements of media presentation description 104.

In this manner, client device 40 may select the adaptation set including representations 110A-110N based on characteristics signaled in media presentation description 104, and then retrieve media data of the other adaptation set (of the subsequent, continuous period) based on the selection of the adaptation set including representations 110A-110N. That is, client device 40 need not evaluate characteristics of the associated adaptation set, because such characteristics are identical (based on the indication in media presentation description 104 that the adaptation set of the subsequent period is associated with the adaptation set including representations 110A-110N).

FIG. 3 is a block diagram illustrating another example system 200 that may implement the techniques of this disclosure. The elements of system 200 in FIG. 4 may generally correspond to elements of FIG. 1. For instance, system 200 includes advertisement (ad) decision server 208, content distribution system 212, and client device 206. The elements of content distribution system 212 may generally correspond to content preparation device 20 and/or server device 60 of FIG. 1, while the elements of client device 206 may correspond to client device 40 of FIG. 1. In some examples, the elements of client device 206 may correspond to retrieval unit 52 of FIG. 1.

In this example, client device 206 includes media engine 202 and DASH access client 204. Content distribution system 212 includes MPD generator 214, packager 216, and content distribution network (CDN)/Origin server 218. Origin server 218 stores MPD 220, main content 222A-222C, and advertisement data 224A-224C.

Media engine 202, DASH access client 204, MPD generator 214, and packager 216 may be implemented in hardware or software. When implemented in software, it is presumed that requisite hardware, such as one or more processing units and one or more computer-readable storage media, are also provided. The computer-readable storage media may store instructions for the software, and the processing units may execute the instructions to perform the functionality described above.

An MPD is available that points to On-Demand content on the CDN containing a single period presentation. The MPD, based on cues (ad insertion opportunities), is modified to ad multiple periods without changing the content on the server. For each opportunity, an xlink to the Ad Decision server is provided. The MPD is provided to the DASH client. For each xlink in the MPD, it is checked if ads are added, possibly targeted to the user. If not, the period is resolved to 0. If so, other content is added. The DASH client plays the content continuously, and if resolved to zero, the media engine is not newly initialized.

MPD generator 214 of FIG. 3 may be configured to indicate that two or more Periods are continuous. Accordingly, MPD generator 214 may indicate adaptation sets of the Periods that are associated, as discussed above, in an MPD (or other manifest file), in accordance with the techniques of this disclosure. Thus, client device 206 may select an adaptation set of one period and an associated adaptation set of another, continuous period, based on characteristics of the adaptation set of the first period signaled in the MPD generated by MPD generator 214.

In this manner, content distribution system 212 and CDN/Origin server 218 represent examples of a device for sending media data, the device including a memory configured to store media data, and one or more hardware-based processors configured to split main content of the media data into a plurality of periods including a first period and a second period that are temporally sequential, insert secondary media content between the first period and the second period, signal a time indicator for each of the plurality of periods, wherein the time indicator defines one or more time characteristics for each of the plurality of periods, and receive a request from a dynamic adaptive streaming over HTTP (DASH) client to retrieve a media stream comprising the plurality of periods, the secondary media content, and the time indicators.

Likewise, client device 206 represents an example of a device for retrieving media data, the device including a memory configured to store media data; and one or more hardware-based processors configured to determine that a manifest file for media content indicates that the media content includes a first period and a second period, that the manifest file indicates that the first and second periods are continuous, and that advertisement media data is available for insertion between the first and second periods, select a first adaptation set in the first period based at least in part on characteristics signaled for the first adaptation set, retrieve media data of the first adaptation set based on the selection of the first adaptation set, retrieve the advertisement media data, and retrieve media data of a second adaptation set in the second period that the manifest file indicates is associated with the first adaptation set based on the selection of the first adaptation set and store the retrieved media data to the memory.

Figure 4:
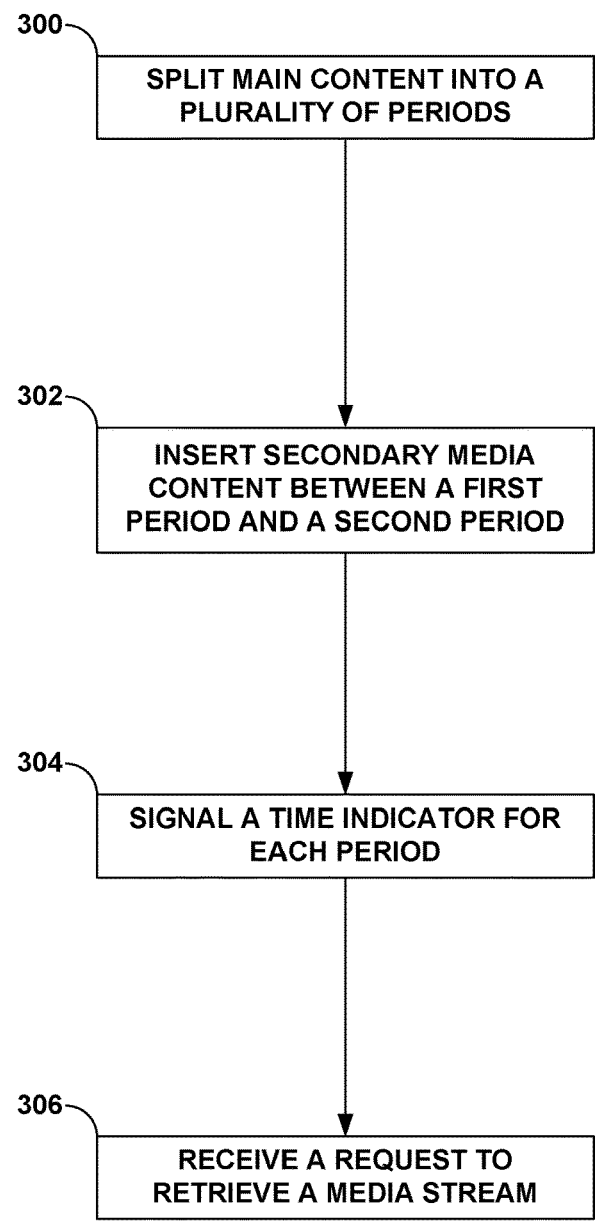
FIGS. 4-6 are flow diagrams illustrating one or more techniques according to various aspects of this disclosure.

FIG. 4 is a flow diagram illustrating a method of sending media data according to one or more techniques of the current disclosure. In this example, a media server may split main content of media data into a plurality of periods (300).

The media server may insert secondary media content between a first period and a second period (302), wherein the first period and the second period are temporally sequential. The secondary media content may be, for example, advertisement media content, which is to be presented in substantially the same manner as the main media content. The media server may signal a time indicator for each of the plurality of periods (304), wherein the time indicator defines one or more time characteristics for each of the plurality of periods. The media server may receive a request to retrieve a media stream (306), e.g., from a dynamic adaptive streaming over HTTP (DASH) client. The request for the media stream may correspond to a request to retrieve a media stream comprising the plurality of periods, the secondary media content, and the time indicators.

Figure 5:
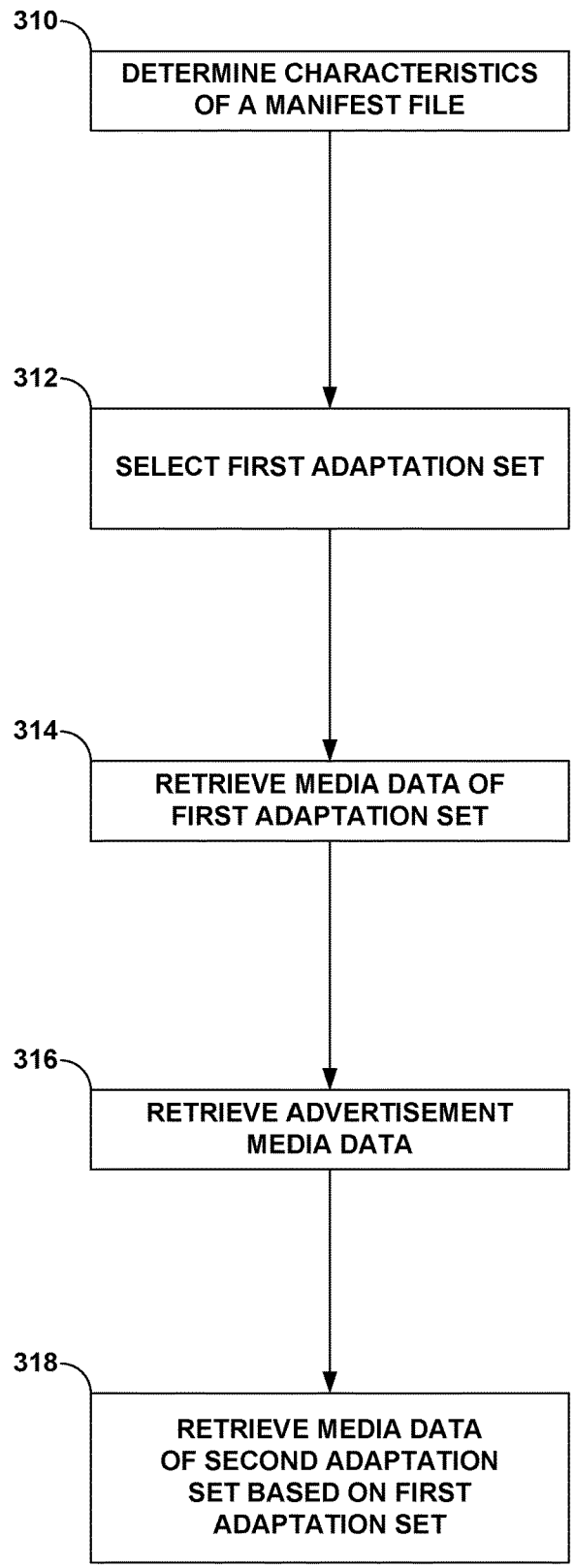

FIG. 5 is a flow diagram illustrating a method of retrieving media data according to one or more techniques of the current disclosure. In this example, a device determines characteristics of a manifest file (310). For instance, the device may determine that the manifest file for media content indicates that the media content includes a first period and a second period, that the manifest file indicates that the first and second periods are continuous, and that advertisement media data is available for insertion between the first and second periods. The device may select a first adaptation set (312). In one example, the first adaptation set may be in the first period, and the selection may be based at least in part on characteristics signaled for the first adaptation set. The device may then retrieve media data of the first adaptation set (314) based on the selection of the first adaptation set. The device may then retrieve the advertisement media data (316). Further, the device may retrieve media data of a second adaptation set based on the selection of the first adaptation set (318). The second adaptation set may be in the second period, and the manifest file may indicate that the second adaptation set is associated with the first adaptation set.

Figure 6:
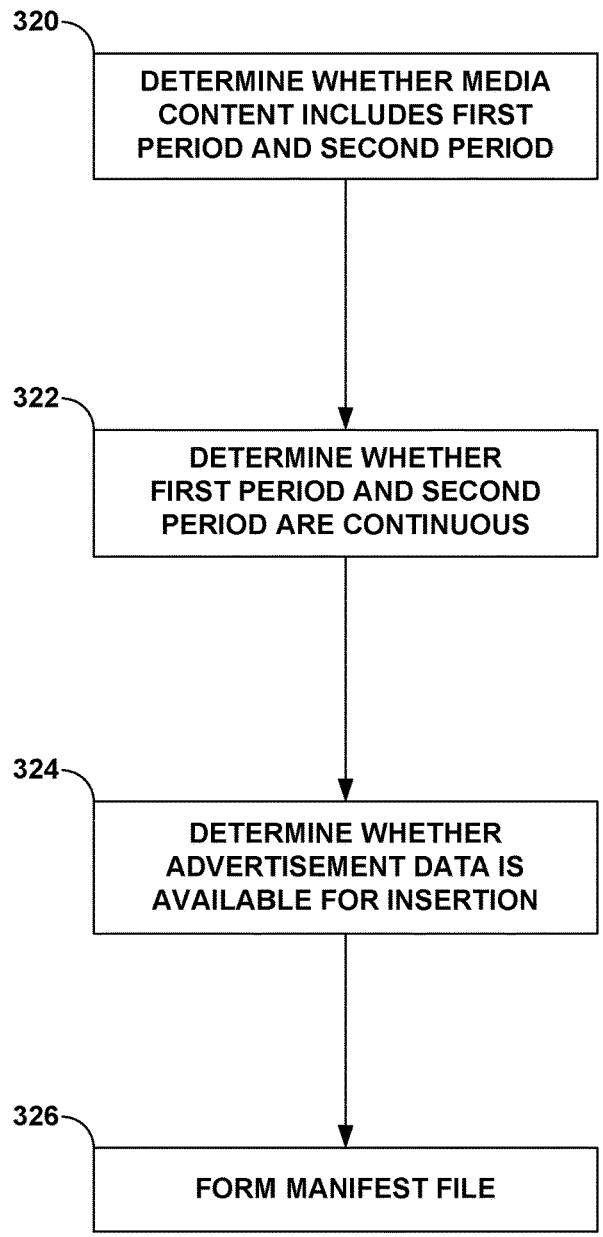

FIG. 6 is a flow diagram illustrating a method of sending media data according to one or more techniques of the current disclosure. In this example, a device may determine whether media content includes a first period and a second period (320). The device may determine whether the first period and the second period are continuous (322). The device may determine whether advertisement media data is available for insertion (324), e.g., between the first and second periods. The device may form a manifest file (326), wherein the manifest file includes indications of whether the media content includes the first period and the second period, whether the first period and the second period are continuous, and whether the advertisement media data is available for insertion between the first and second periods.

Figure 7:
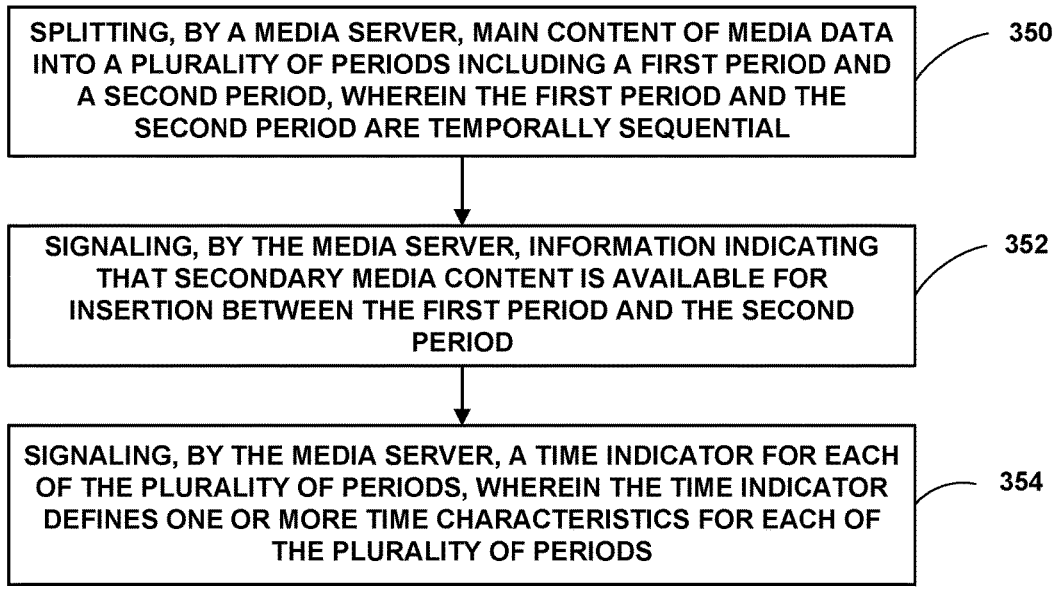
FIG. 7 is a flowchart illustrating an example method of performing certain techniques of this disclosure by a media server.

FIG. 7 is a flowchart illustrating an example method of performing certain techniques of this disclosure by a media server. This example method includes splitting, by a media server, main content of media data into a plurality of periods including a first period and a second period, wherein the first period and the second period are temporally sequential (350). This example method also includes signaling, by the media server, information indicating that secondary media content is available for insertion between the first period and the second period (352). This example method further includes signaling, by the media server, a time indicator for each of the plurality of periods, wherein the time indicator defines one or more time characteristics for each of the plurality of periods (354).

Figure 8:
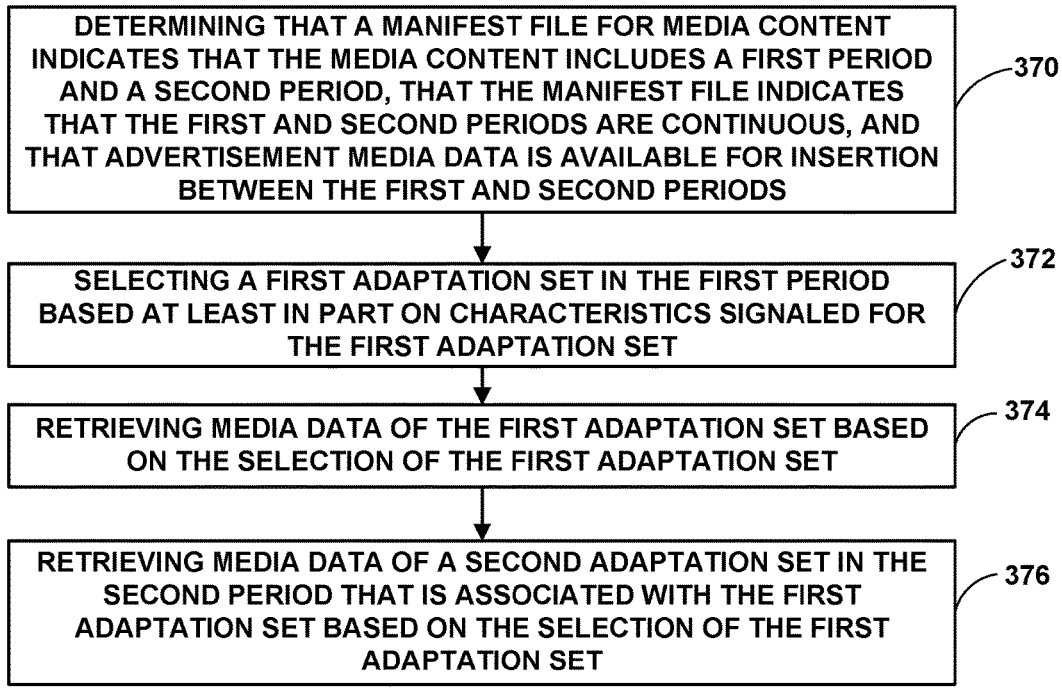
FIG. 8 is a flowchart illustrating an example method of performing certain techniques of this disclosure by a client device.

FIG. 8 is a flowchart illustrating an example method of performing certain techniques of this disclosure by a client device. This example method includes determining that a manifest file for media content indicates that the media content includes a first period and a second period, that the manifest file indicates that the first and second periods are continuous, and that advertisement media data is available for insertion between the first and second periods (370). This example method also includes selecting a first adaptation set in the first period based at least in part on characteristics signaled for the first adaptation set (372). This example method further includes retrieving media data of the first adaptation set based on the selection of the first adaptation set (374). Finally, this example method includes retrieving media data of a second adaptation set in the second period that is associated with the first adaptation set based on the selection of the first adaptation set (376).

It should be understood that in some examples, a client device may be configured to perform any or all of the techniques of the first example, the second example, and the third example described above. For example, different content distribution networks may support different mechanisms for targeted advertisement insertion, and a client device may implement the techniques of any or all of the first example, the second example, and/or the third example. As another example, a content distribution network may support any or all of the techniques of the first example, the second example, and/or the third example described above. Moreover, the techniques of the first example, the second example, and/or the third example described above may be performed together in any combination.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It could be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above could also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of sending media data, the method comprising:
    splitting, by a media server, main content of media data into a plurality of periods including a first period and a second period, wherein the first period and the second period are temporally sequential;
    adding, by the media server, one or more synchronization points to the plurality of periods;
    signaling, by the media server, information indicating that secondary media content is available for insertion between the first period and the second period; and
    signaling, by the media server, a time indicator for each of the plurality of periods, wherein the time indicator defines one or more time characteristics for each of the plurality of periods.

2. The method of claim 1, wherein the main content is a single file.

3. The method of claim 1, wherein the main content is a plurality of on-demand profile periods.

4. The method of claim 1, wherein the time indicator comprises a presentation start time and a presentation duration for each of the plurality of periods.

5. The method of claim 1, wherein the time indicator comprises a presentation start time and a presentation end time.

6. The method of claim 1, wherein the media data is an on-demand media content stream.

7. The method of claim 1, wherein the media data is a live media content stream.

8. The method of claim 1, wherein inserting comprises inserting the secondary media content based on manifest file level information.

9. The method of claim 1, wherein inserting comprises inserting the secondary media content based on based on media presentation description (MPD)-level information.

10. The method of claim 1, wherein the secondary media content is advertisement media data.

11. The method of claim 1, further comprising receiving, by the media server, a request from a dynamic adaptive streaming over HTTP (DASH) client to retrieve a media stream comprising the plurality of periods, the secondary media content, and the time indicators.

12. A device for sending media data, the device comprising:
    a memory configured to store media data; and
    one or more hardware-based processors configured to:
        split main content of media data into a plurality of periods including a first period and a second period, wherein the first period and the second period are temporally sequential;
        add one or more synchronization points to the plurality of periods;
        signal information indicating that secondary media content is available for insertion between the first period and the second period; and
        signal a time indicator for each of the plurality of periods, wherein the time indicator defines one or more time characteristics for each of the plurality of periods.

13. The device of claim 12, wherein the time indicator comprises a presentation start time and at least one of a presentation duration for each of the plurality of periods or a presentation end time.

14. The device of claim 12, wherein the one or more hardware-based processors are further configured to receive a request from a dynamic adaptive streaming over HTTP (DASH) client to retrieve a media stream comprising the plurality of periods, the secondary media content, and the time indicators.

* * * * *